United States Patent
Asada

(10) Patent No.: US 8,908,226 B2
(45) Date of Patent: Dec. 9, 2014

(54) INFORMATION PROCESSING DEVICE, CONTROL METHOD OF AN INFORMATION PROCESSING DEVICE, AND STORAGE MEDIUM STORING A PROGRAM EXECUTED BY A CONTROL UNIT OF THE INFORMATION PROCESSING DEVICE

(71) Applicant: Seiko Epson Corporation, Tokyo (JP)

(72) Inventor: Kenji Asada, Matsumoto (JP)

(73) Assignee: Seiko Epson Corporation, Tokyo (JP)

(*) Notice: Subject to any disclaimer, the term of this patent is extended or adjusted under 35 U.S.C. 154(b) by 0 days.

(21) Appl. No.: 14/021,126

(22) Filed: Sep. 9, 2013

(65) Prior Publication Data

US 2014/0071495 A1    Mar. 13, 2014

(30) Foreign Application Priority Data

Sep. 7, 2012  (JP) ................. 2012-197265

(51) Int. Cl.
  *G06F 3/12*    (2006.01)
(52) U.S. Cl.
  CPC ............ *G06F 3/1242* (2013.01); *G06F 3/1208* (2013.01); *G06F 3/1257* (2013.01); *G06F 3/1255* (2013.01); *G06F 3/1285* (2013.01)
  USPC ............................ 358/1.2; 358/1.13; 358/1.15
(58) Field of Classification Search
  CPC ... G06F 3/1204; G06F 3/1242; G06F 3/1257; G06F 3/1285
  USPC .......................... 358/1.18, 1.1, 1.15
  See application file for complete search history.

(56) References Cited

U.S. PATENT DOCUMENTS

2009/0213406 A1* 8/2009 Kimura ................. 358/1.13
2011/0122429 A1  5/2011 Hirayama et al.

FOREIGN PATENT DOCUMENTS

JP    2007088944 A    4/2007
JP    2012-048415 A    3/2012

* cited by examiner

*Primary Examiner* — King Poon
*Assistant Examiner* — Iriana Cruz
(74) *Attorney, Agent, or Firm* — Nutter McClennen & Fish LLP; John J. Penny, Jr.; Taylor M. Coon

(57) ABSTRACT

When a recording device that records according to a template is replaced with a new recording device, the new recording device can also record according to the template of the replaced recording device. A template terminal can connect to a first printer storing a first template database related to a first template and records according to the first template. A control unit acquires the first template database from the first printer, processes the first template database according to a difference in the structure of the first printer and a second printer that records according to a second template, and generates a second template database related to a second template stored in the second printer.

6 Claims, 4 Drawing Sheets

| D1 | D2 | D3 | D4 | D5 DEFAULT IMAGE INFORMATION | D52 | D6 | D7 | D8 |
|---|---|---|---|---|---|---|---|---|
| TEMPLATE NAME | FIELD NAME | FIELD REFERENCE COORDINATES | SIZE | D51 IMAGE REFERENCE COORDINATES | RECORDING IMAGE INFORMATION | FRAME INFORMATION | BACKGROUND INFORMATION | FIELD ATTRIBUTE |
| TEMPLATE T1 | FIELD A1 | (X1, Y1) | (W1, H1) | (x1, y1) | IMAGE DATA GD1 | BLACK | NONE | ATTRIBUTE Z1 |
| | FIELD A2 | (X2, Y2) | (W2, H2) | | | BLACK | NONE | ATTRIBUTE Z2 |
| | FIELD A3 | (X3, Y3) | (W3, H3) | (x3, y3) | 'THANK YOU' FONT SIZE (fa1) | BLACK | NONE | ATTRIBUTE Z3 |

FIG. 3

INFORMATION PROCESSING DEVICE, CONTROL METHOD OF AN INFORMATION PROCESSING DEVICE, AND STORAGE MEDIUM STORING A PROGRAM EXECUTED BY A CONTROL UNIT OF THE INFORMATION PROCESSING DEVICE

The instant application claims the benefit of Japanese patent application No. 2012-197265 filed Sep. 7, 2012, the entire disclosure of which is incorporated by reference herein.

BACKGROUND

1. Technical Field

The present disclosure relates to an information processing device that connects to a recording device that records based on a template, to a method of controlling the information processing device, and to a storage medium storing a program for controlling the information processing device.

2. Related Art

Recording devices that record using predefined templates are known from the literature. See, for example, Japanese Unexamined Patent Appl. Pub. JP-A-2012-048415. This type of recording device connects to a control device, and records based on a template as controlled by the control device.

The recording device that records based on a template may be replaced by another new recording device. If the new recording device can record using the template even though the recording device being replaced and the new recording device are configured (structured) differently, replacing the recording device is simple and user convenience can be improved.

SUMMARY

When a recording device that records based on a template is replaced with a new recording device, at least one embodiment of the present invention enables recording with the new recording device based on the template.

One aspect of at least one embodiment of the present invention is an information processing device connectable to a first recording device that stores first template data related to a first template and records according to the first template, including: a control unit that acquires the first template data from the first recording device, generates second template data related to a second template based on the acquired first template data, and stores the second template data in a second recording device. The control unit acquires the first template data from the first recording device and generates the second template data by processing the first template data according to a difference in the structure of the first recording device and second recording device.

Based on first template data acquired from a first recording device, the information processing device in this aspect of the invention processes the first template data according to a difference in the structure of the first recording device and second recording device, and generates second template data. As a result, when the recording device connected to the control device for recording changes from a first recording device to a second recording device, and the structures of the recording devices differ, the second recording device can record according to the template of the first recording device based on the generated second template data.

Another aspect of at least one embodiment of the present invention is a control method of an information processing device connectable to a first recording device that stores first template data related to a first template and records according to the first template, including: acquiring first template data from the first recording device; and generating and storing second template data related to a second template in a second recording device that records according to a second template by processing the first template data according to a difference in the structure of the first recording device and the second recording device.

Based on first template data acquired from a first recording device, the information processing device using the control method in this aspect of the invention processes the first template data according to a difference in the structure of the first recording device and second recording device, and generates second template data. As a result, when the recording device connected to the control device for recording changes from a first recording device to a second recording device, and the structures of the recording devices differ, the second recording device can record according to the template of the first recording device based on the generated second template data.

Another aspect of the invention is a non-volatile computer-readable storage medium storing a program executed by a control unit that controls an information processing device connectable to a first recording device that stores first template data related to a first template and records according to the first template, the program causing the control unit to execute steps including: acquiring first template data from the first recording device; and generating and storing second template data related to a second template in a second recording device that records according to a second template by processing the first template data according to a difference in the structure of the first recording device and the second recording device.

Based on first template data acquired from a first recording device, the information processing device executing the program in this aspect of the invention processes the first template data according to a difference in the structure of the first recording device and second recording device, and generates second template data. As a result, when the recording device connected to the control device for recording changes from a first recording device to a second recording device, and the structures of the recording devices differ, the second recording device can record according to the template of the first recording device based on the generated second template data.

When a recording device that records according to a template is replaced with a new recording device, at least one embodiment of the present invention enables the new recording device to also record according to the template.

Other objects and attainments together with a fuller understanding of the disclosure will become apparent and appreciated by referring to the following description and claims taken in conjunction with the accompanying drawings.

BRIEF DESCRIPTION OF THE DRAWINGS

FIG. 3 shows the data structure of a second template database.

DESCRIPTION OF EMBODIMENTS

Some embodiments of the present disclosure are described below with reference to the accompanying figures.

Figure 1:
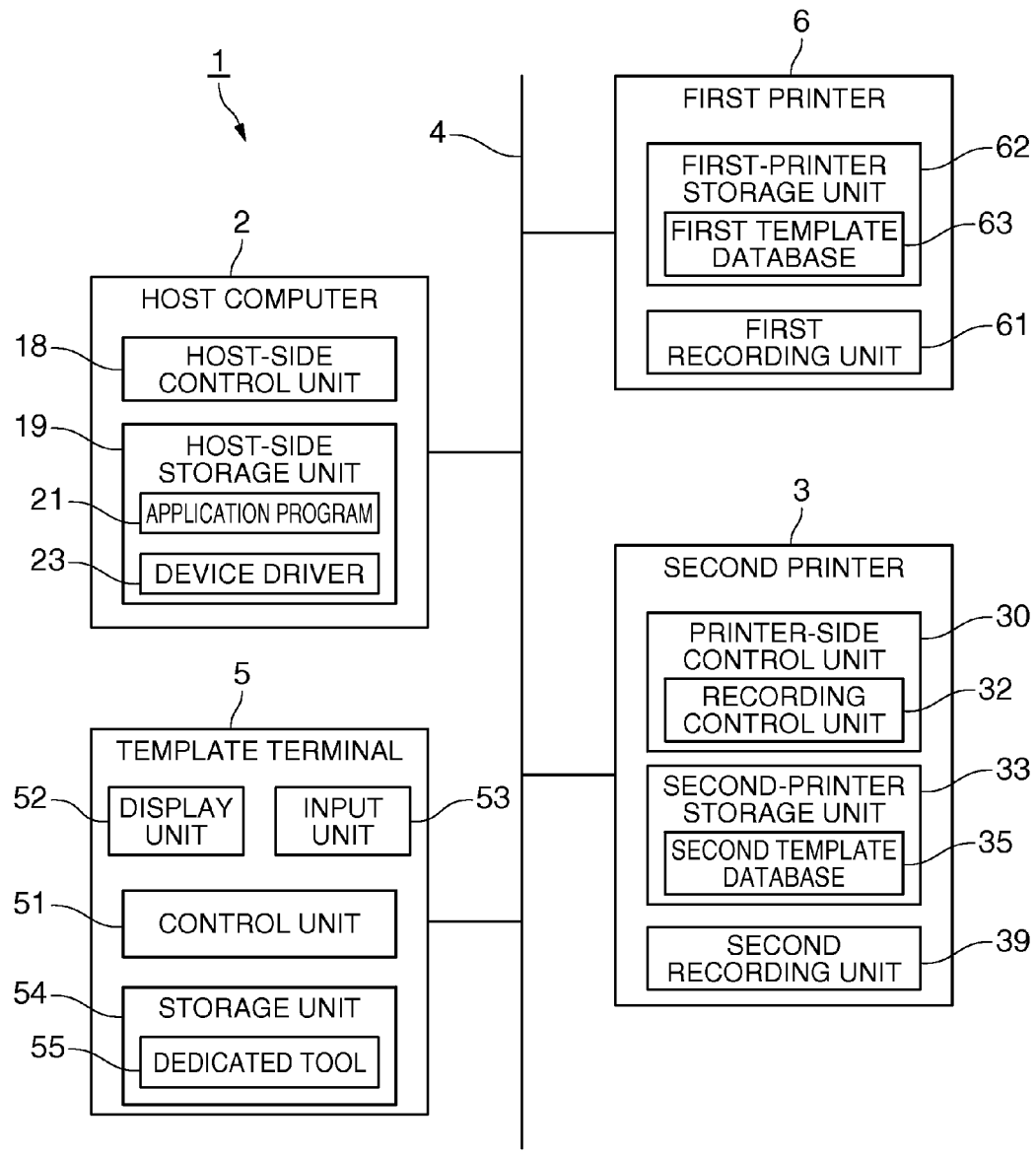
FIG. 1 is a block diagram showing the functional configuration of a control system.

FIG. 1 is a function block diagram showing the configuration of a control system according to some embodiments of the disclosure.

As shown in FIG. 1, a control system 1 according to this embodiment of the disclosure includes a host computer 2 (control device) and a second printer 3 (second recording device) that connects to the host computer 2 through a network 4 and records images on a recording medium as controlled by the host computer 2. More specifically, label paper having adhesive labels cut to a specific size affixed on a continuous web is loaded into the second printer 3, and the second printer 3 records an image based on a template (second template) on a label affixed to the web.

The network 4 is a wired LAN or wireless LAN network conforming to a specific standard such as Ethernet (R). Network devices using the USB or RS-232C protocol may also be connected to the network 4.

A first printer 6 (first recording device) was connected to the host computer 2 and the host computer 2 controlled the first printer 6 to record images on the labels based on a template (first template) before replacing the first printer 6 with the second printer 3 for recording. An object of the control system 1 according to this embodiment of the invention is to enable recording with the second printer 3 that replaces the first printer 6 based on the template that was used by the first printer 6 before being replaced even when there are differences in the structures (configuration) of the first printer 6 and second printer 3.

As shown in FIG. 1, a template terminal 5 (information processing device) described below can also connect to the network 4. More specifically, the template terminal 5 can communicate over the network 4 with both the first printer 6 and second printer 3.

The host computer 2 can include a host-side control unit 18 and a host-side storage unit 19.

The host-side control unit 18 can include CPU, RAM, ROM, and other peripheral circuits, and centrally controls parts of the host computer 2.

The host-side storage unit 19 includes memory that stores data nonvolatilely, and stores at least an application program 21 and a device driver 23.

To record an image on a label with the second printer 3, the application program 21 generates and outputs information related to the image to be recorded on the label ("label image information" below) to the device driver 23.

The device driver 23 is a program for controlling the first printer 6, and is written according to the hardware and software specifications of the first printer 6. When label image information is input from the application program 21, the device driver 23 generates and outputs control commands written in the command language used to control the first printer 6 (the command set of the first printer 6) to the second printer 3. Using the method described below, the second printer 3 records an image on a label according to the template based on the control commands written in the command set of the first printer 6.

The second printer 3 has a second recording unit 39 including hardware such as a recording head and conveyance rollers needed to record an image, and a controller that controls the hardware, and the second recording unit 39 records an image on a label of the label paper.

The second printer 3 has a printer-side control unit 30 including CPU, RAM, and ROM, and centrally controls parts of the second printer 3. The command set that controls the second printer 3 may be different from the command set of the first printer 6. The printer-side control unit 30 includes a recording control unit 32 that, when a control command in the command set of the first printer 6 is received from the host computer 2, interprets the control command and records the image with the second recording unit 39. The function of the recording control unit 32 is achieved by the cooperation of hardware and software, such as the CPU of the printer-side control unit 30 reading and running a firmware program. This function enables the second printer 3 to record an image based on a control command in the command set of the first printer 6 even when the command set that controls the second printer 3 differs from the command set of the first printer 6.

The second printer 3 also has a second-printer storage unit 33 that nonvolatilely stores a program and data. A second template database 35 (second template data) as further described below is stored in the storage area of the second-printer storage unit 33.

The first printer 6 has a first recording unit 61 including the mechanisms used for recording, and a first-printer storage unit 62 that stores data. A first template database 63 (first template data) as described below is stored in the first-printer storage unit 62.

The template terminal 5 includes a control unit 51, display unit 52, input unit 53, and storage unit 54.

The control unit 51 includes a CPU, ROM, RAM, and centrally controls the template terminal 5.

The display unit 52 has an LCD panel or other display panel, and displays information on the display panel as controlled by the control unit 51.

The input unit 53 is an input device such as a mouse or keyboard that detects operation of the input device, and outputs to the control unit 51.

The storage unit 54 includes a hard disk drive or other nonvolatile memory device, and stores data nonvolatilely. A dedicated tool 55, which is a software tool, is installed to the template terminal 5. The control unit 51 executes the processes described below using a function of the dedicated tool 55.

The second printer 3 according to this embodiment of the disclosure records an image on a label according to a template as controlled by the host computer 2.

A template is information describing rules for recording an image in the recording area of the label, and in this embodiment includes the layout (pattern) of fields (areas) that can be printed in the recording area of the label. The recording area of a label is the maximum size of the space in which images can be recorded (dots can be placed) on one label. The recording area is segmented into fields (areas) according to the content of the image (information) to be recorded. Plural templates with different layouts of fields in the recording area are prepared in advance in this embodiment, and the second printer 3 can record images on labels based on any one of the templates.

Figure 2:
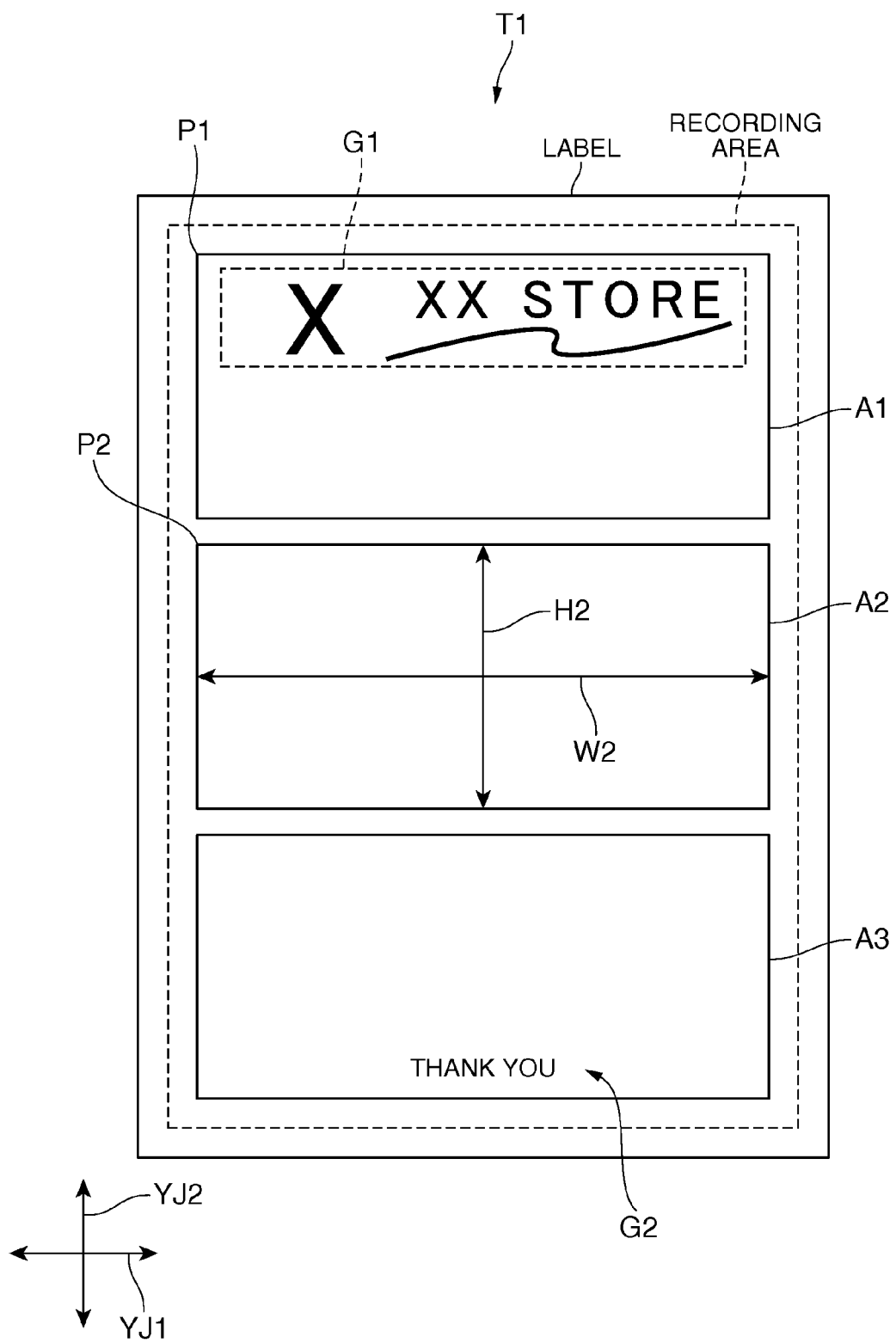
FIG. 2 shows an example of a template.

FIG. 2 shows one template T1 of the plural previously configured templates. As shown in FIG. 2, the template T1 has three rectangular fields, fields A1 to A3, formed sequentially from top to bottom.

The information related to each field in the template is defined in a second template database.

FIG. 3 shows an example of the data structure of the second template database. FIG. 3 shows the record for the template T1 shown in FIG. 2. The second template database in the example in FIG. 3 is a relational database, but the second template database is not so limited.

The template name D1 field contains the name (identifier) uniquely assigned to the template.

The field name D2 fields contain the names (identifiers) of the fields included in the template. As shown in FIG. 2, template T1 has three fields A1 to A3. As shown in FIG. 3, the second template database therefore contains three field records, one for each of the three fields A1 to A3, related to template T1, and each record stores an appropriate name in the field name D2 field.

The field reference coordinates D3 field contains the coordinates of a reference point for the field in a coordinate system of which the origin is a specific position in the recording area of the label. Any desired position in the recording area of the label can be specified using coordinates in this coordinate system. In this embodiment, the shape of each field in the recording area is a rectangle having two sides parallel to the short axis YJ1 of the label, and two sides parallel to the long axis YJ2, as shown in FIG. 2. The origin of a field denotes a specific one of the four vertices of the field frame. As indicated by vertex P1 of field A1 in FIG. 2 and vertex P2 of field A2 in FIG. 2, the vertex at the top left of the four corners of each frame is the origin in this embodiment.

The size D4 field contains information indicating the length W of the field on the short axis YJ1, and the length H of the field on long axis YJ2. For example, information denoting length W2 and length H2 is stored in the size D4 of field A2 in FIG. 2. Because the fields are rectangular as described above, the position, shape, and size of each field in the recording area can be uniquely determined using the field reference coordinates D3 and the size D4.

The default image information D5 field contains information related to the image ("default image" below) that is recorded in the corresponding field regardless of an instruction from the host computer 2. The default image information D5 field includes image reference coordinates D51 and recording image information D52 fields. The image reference coordinates D51 field contains the coordinates of the origin of the default image in the above coordinate system. The recording image information D52 field contains information about the default image to be recorded.

For example, image G1 is recorded as the default image in the top of the field A1 in FIG. 2. In this instance, image data GD1, which is the image data (such as a bitmap image) for the image G1 recorded in field A1 in FIG. 2, is stored in the recording image information D52 field of the record for field A1 as shown in FIG. 3.

As also shown in the bottom of field A3 in FIG. 2, in image G2 composed of the phrase THANK_YOU (where the underscore (_) character denotes a space) is recorded as a default image in field A3. In this instance, information indicating the phrase THANK_YOU, information indicating the font size of the phrase, or other information identifying the default text image is stored in the recording image information D52 field of the record for field A3 as shown in FIG. 3.

The frame information D6 field contains information describing the color of the frame around the area. If the second printer 3 is a color printer, a frame color can be specified for each field, and the frame will be recorded on the label in the specified color. Note that the color of the frame or the background described below can also be set to "none," that is, the frame is not recorded or color is not added to the background.

The background information D7 field contains information identifying the color of the background in the field. When the second printer 3 is a color printer, a background color can be specified for each field. For example, if the information stored in the background information D7 is blue, the entire corresponding field will be printed blue.

The field attribute D8 field contains information about a specific field attribute. A field attribute is information expressing a feature, characteristic, or content, for example, of the image (information) recorded in the corresponding field.

The control unit 51 of the template terminal 5 generates the records in the second template database 35 based on the first template database 63 stored in the first printer 6. A corresponding record is therefore created in the second template database 35 for each template that can be used by the first printer 6, and the second printer 3 can record images based on the templates used by the first printer 6.

More specifically, the template name, the name of each field in the template, location and size information for each field, and information about the default image to be recorded in each field are relationally stored for each template that can be used by the first printer 6 in the first template database 63 stored by the first printer 6. For the template on which template T1 is based, the first template database 63 relationally stores template T1 as the template name, fields A1 to A3 as the field names, information denoting the position and size of each of the fields A1 to A3, and information related to the default image to be recorded in each field.

The control unit 51 of the template terminal 5 communicates over the network 4 with the first printer 6 and requests transmission of the first template database 63. In response to this request, the first printer 6 sends the first template database 63 to the template terminal 5.

Based on the received first template database 63, the control unit 51 of the template terminal 5 then generates the appropriate records in the second template database 35. The control unit 51 of the template terminal 5 also accesses the second template database 35 over the network 4 and creates records by storing the appropriate information in the appropriate fields of the database. This process is a process of acquiring first template data from the first recording device, and generating second template data registered in a second recording device based on the acquired first template data.

More specifically, for each template that can be used by the first printer 6, the control unit 51 generates a record in the second template database 35 for each field in the template. For each generated record, the control unit 51 stores the name of the template stored in the first template database 63 directly in the template name D1 field. For each generated record, the control unit 51 also stores the name of each field stored in the first template database 63 directly to the field name D2 field. As a result, the template name and field names managed in the first template database 63 of the first printer 6 will directly match the template name stored in the template name D1 field of the template managed in the second template database 35 of the second printer 3, and the names of the fields indicated in the field name D2 fields.

For each field in the template, the control unit 51 calculates the field reference coordinates D3 and size D4 based on the field position and size information contained in the original template data (the template data used by the recording device that is replaced), and stores the calculated values in the field reference coordinates D3 and size D4 fields of the generated database record.

Note that the dedicated tool 55 also contains a program with an algorithm for outputting the field reference coordinates D3 and size D4 information based on the input field position and size information contained in the original template data, and calculates the field reference coordinates D3 and size D4 information for each field using a function of the program.

Operation of the template terminal 5 when storing information in the default image information D5 field is described below.

After storing appropriate information in the corresponding template name D1, field name D2, field reference coordinates D3, size D4, and default image information D5 fields of the record generated for each field contained in a template, the control unit 51 stores default values in the frame information D6, background information D7, and field attribute D8 fields. The default values to be stored can be predefined by the user.

The control unit 51 of the template terminal 5 can also update specific information in specific records of the second template database as instructed by the user. More specifically, the dedicated tool 55 also communicates with the printer-side control unit 30 of the second printer 3, accesses the second template database stored in the second-printer storage unit 33, and acquires content therefrom, and displays the content from the second template database on the display panel together with a user interface enabling the user to update specific information in a specific record. The user can refer to the user interface on the display panel and operate an input device of the input unit 53 to update specific information.

The basic operation of the host computer 2 and second printer 3 when recording an image on a label according to a template is described next.

As described above, to record an image on a label, the application program 21 of the host computer 2 first generates and outputs label image information to the device driver 23. Based on the label image information, the device driver 23 then generates and outputs a control command instructing the recording of an image on a label to the second printer 3.

This control command is a command in the command set of the first printer 6, and includes information specifying the name of the template to use, and related information for each field in the template specifying the name of the field and the image to be recorded in the field identified by the field name.

When the control command is input, the recording control unit 32 of the second printer 3 analyzes the control command and extracts the name of the specified template. As described above, the template names managed by the first printer 6 exactly match the names stored in the template name D1 field of the second template database managed by the second printer 3. The recording control unit 32 references the second template database 35, and extracts the record storing the name of the extracted template in the template name D1 field. The extracted record is a record of the template to be used to record an image on the label. Based on the extracted record, the recording control unit 32 then records images in each field of the template while managing the position, shape, default image to be recorded, and image position based on the field reference coordinates D3, size D4, and default image information D5 fields of each template field. If color printing is possible, the recording control unit 32 also records a frame and background based on the color information contained in the frame information D6 and background information D7 database fields. While recording, the recording control unit 32 analyzes the commands in the command set of the first printer 6 to manage the image and the position of the image to be recorded in each template field, and record the appropriate image specified by the control command in the appropriate position of each template field. Note that the firmware includes a function for analyzing control commands in the command set of the first printer 6.

The operation whereby the control unit 51 of the template terminal 5 stores information in the default image information D5 field of the second template database 35 based on the first template database 63 is described next in detail.

Information indicating the position of the default image, and the source image data for recording the default image (bitmap data or other data storing information for each pixel in the image), is stored relationally to the information about any one template field in the first template database 63. In this instance, the control unit 51 extracts the image reference coordinates D51 based on the information indicating the position of the default image from the first template database 63, and stores the information from the image reference coordinates D51 field in the image reference coordinates D51 field of the corresponding record in the second template database 35.

The control unit 51 also stores the image data in the recording image information D52 field based on the image data related to the default image in the first template database 63.

When storing the image data in the recording image information D52 field, the control unit 51 in this embodiment first appropriately processes the image data according to the differences in the configuration of the first printer 6 and second printer 3.

Figure 4:
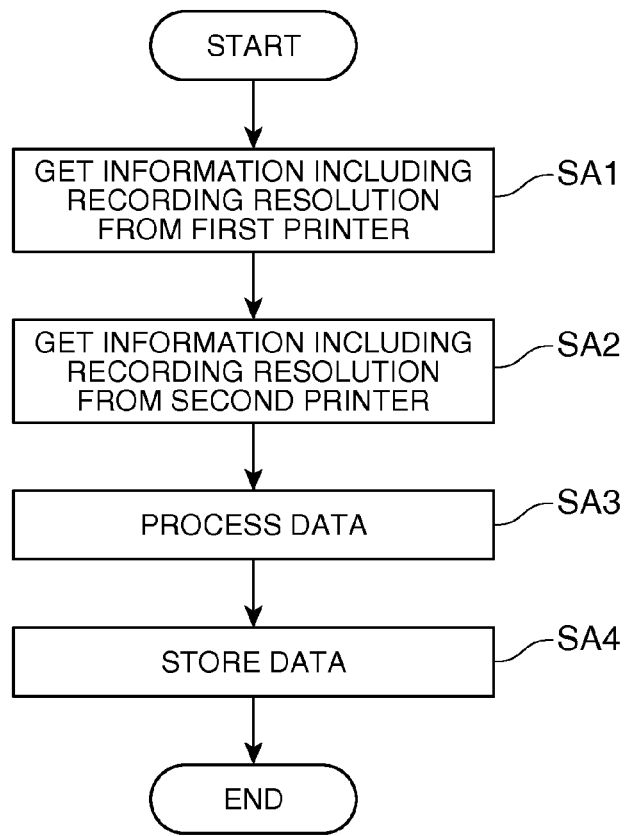
FIG. 4 is a flow chart showing the operation of a template terminal.

FIG. 4 is a flow chart showing the operation of the template terminal 5 when processing the original image data (the image data before being processed, referred to below as the original image data) of an image recorded in the first template database 63 for storing in the recording image information D52 field of the corresponding record in the second template database 35.

The control unit 51 of the template terminal 5 first acquires the resolution, method, and type of the recording method used by the first printer 6 (step SA1).

The recording method identifies whether the printer records using an inkjet, dot impact, thermal, or other recording method. The recording type identifies, for example, whether the printer is a serial printer that records images on the recording medium with the recording medium held stationary while a serial head moves over the recording medium, or is a line printer that records with a stationary recording head while moving the recording medium past the recording head.

The control unit 51 can acquire the recording resolution, method, and type in step SA1 as described below, for example.

For example, the control unit 51 communicates with the first printer 6 according to a specific protocol to request transmission of the recording resolution and other information, and receives the resolution and other information based on the information received in response to the request. This method requires first defining the communication protocol, and the first printer 6 being compatible with that protocol.

Alternatively, using a function of the dedicated tool 55, the control unit 51 displays an appropriate user interface on the display panel of the display unit 52 for the user to input the resolution and other information about the first printer 6, and receives the resolution and other information based on the information input by the user through the user interface.

Further alternatively, the resolution and other information could be stored related to the model or product name of the first printer 6, and the control unit 51 could prompt the user to input the model or product name of the first printer 6 through the user interface, and acquire the resolution and other information about the first printer 6 based on the user input.

Next, the control unit 51 acquires the recording resolution, recording method, and recording type of the second printer 3 (step SA2). This information can be acquired in the same way as described in step SA1.

Next, the control unit 51 processes the original image data according to the differences in recording resolution and other structural differences, and generates new image data (image data after being processed, referred to below as the new image data) (step SA3).

Specific examples of processing image data based on these structural differences is described below.

Different Recording Resolution

In this example the first printer 6 records at 300 dpi, and the second printer 3 can record at 180 dpi, 360 dpi, or 720 dpi. The original image data in the first template database 63 is therefore image data for recording with a 300 dpi printer. For brevity, the recording method and style of both printers are the same.

In this event, the control unit 51 generates new image data at 180 dpi, 360 dpi, and 720 dpi using an existing resolution conversion algorithm based on the original image data for printing at 300 dpi. In this example, the recording image information D52 field of the second template database 35 stored in the second printer 3 has a data structure enabling appropriately storing new image data at each resolution.

Recording Method and Type are Different

In this example the first printer 6 is a thermal line printer, and the second printer 3 is a serial inkjet printer. A thermal line printer is a recording device that records an image (forms dots) using a stationary thermal line printhead, and has the recording element (heat element line) disposed transversely to the conveyance direction of the recording medium. A serial inkjet printer is a recording device that records an image (forms dots) by ejecting ink at the appropriate timing while the inkjet head scans in a primary scanning direction over the stationary recording medium, and has the recording elements (nozzle line) disposed in the conveyance direction of the recording medium (perpendicularly to the primary scanning direction).

The original image data in this example is binary data for a thermal printer.

In this instance the control unit 51 converts the value of each dot of the binary original image data to a specific gradation value that can be converted to a volume of ink, and generates the new image data by appropriately rearranging and converting the dots in the original image data for a line head having the recording elements arrayed perpendicularly to the recording medium conveyance direction to data for a serial head having the recording elements arrayed in the recording medium conveyance direction by a known data process. Other necessary image processes are also executed appropriately.

After generating the new image data, the control unit 51 accesses the second template database 35 of the second printer 3 through the network 4, and stores the generated new image data in the appropriate format to the recording image information D52 field of the corresponding record in the database (step SA4).

As a result, new image data corresponding to the configuration of the second printer 3 (recording resolution, recording method, recording type) is stored in the recording image information D52 field. The second printer 3 can then record the default image based on the image data stored in the recording image information D52 field. The user also does not need to specifically create image data matching the second printer 3 configuration (recording resolution, recording method, recording type) and store the image data in the second template database 35. The device therefore is very user-friendly and easy to use, and changing from the first printer 6 to the second printer 3 is simple.

As described above, the template terminal 5 (information processing device) according to this embodiment of the disclosure has a control unit 51 that acquires the first template database 63 from the first printer 6 (first recording device), and based on the acquired first template database 63 generates a second template database 35 stored in the second printer 3 (second recording device). The control unit 51 acquires the first template database 63 from the first printer 6, processes the image data for the default image (original image data) in the first template database 63 based on the differences in the configurations of the first printer 6 and secondprinter 3, and generates and stores the image data (new image data) in a specific field of the second template database 35.

When the recording device that is connected to the host computer 2 for recording is changed from the first printer 6 to the second printer 3 and the configurations of the recording devices differ, the second printer 3 according to this embodiment of the disclosure can therefore record the default image based on the image data that was generated for the default image (new image data), and can record according to a template that was used by the first printer 6.

When the first printer 6 and second printer 3 are recording devices with different recording resolutions, the control unit 51 in this embodiment of the disclosure processes the image data for the default image in the first template database 63 based on the difference in the recording resolution, and generates and stores the new image data in the second template database 35.

When the recording device that is connected to the host computer 2 for recording is changed from the first printer 6 to the second printer 3 and the recording resolutions of the recording devices differ, the second printer 3 according to this embodiment of the disclosure can therefore record according to a template that was used by the first printer 6 based on the image data (new image data) generated for the default image.

When the second printer 3 can record at plural recording resolutions, the control unit 51 in this embodiment of the disclosure processes the image data (original image data) for the default image in the first template database 63 based on the differences in the recording resolutions of the first printer 6 and second printer 3, and generates and stores image data (new image data) in the second template database 35 at each of the plural resolutions that can be used by the second printer 3.

The second printer 3 can therefore record appropriately according to the template based on the new image data corresponding to the selected recording resolution.

When the recording methods of the first printer 6 and second printer 3 differ, the control unit 51 in this embodiment of the disclosure processes the image data (original image data) for the default image in the first template database 63 based on the differences in the recording methods of the first printer 6 and second printer 3, and generates and stores image data (new image data) in the second template database 35.

When the recording device that is connected to the host computer 2 for recording is changed from the first printer 6 to the second printer 3 and the recording methods of the recording devices differ, the second printer 3 according to this embodiment of the disclosure can therefore record the default image based on the image data that was generated for the default image (new image data), and can record according to a template that was used by the first printer 6.

In the embodiment the first printer 6 is a device that records by moving the recording medium relative to the recording head, and the second printer 3 is a device that records by moving the recording head relative to the recording medium. In this embodiment, the control unit 51 processes the image data (original image data) for the default image in the first template database 63 based on the differences in the recording operations of the first printer 6 and second printer 3, and generates and stores image data (new image data) in the second template database 35.

When the recording device that is connected to the host computer 2 for recording is changed from the first printer 6 to the second printer 3 and the recording operations of the recording devices differ, the second printer 3 according to this embodiment can therefore desirably record the default image based on the image data that was generated for the default image (new image data), and can record according to a template that was used by the first printer 6.

The disclosure is not limited thereto and can be modified and adapted in many ways without departing from the scope of the accompanying claims.

For example, the function that generates the second template database 35 (new image data) based on the first template database 63 (original image data) is performed by the template terminal 5 in the embodiment described above, but the device with this function is not limited to the template terminal 5, and could be the host computer 2 or the second printer 3. In this implementation the host computer 2 or the second printer 3 functions as an information processing device.

The foregoing embodiment describes processing the image data for a default image based on differences in the structure of the first printer 6 and second printer 3, but processing is not limited to the default image, and any template data that differs because of structural differences in the devices can be processed appropriately.

The function blocks shown in FIG. 1 can also be desirably achieved by the cooperation of hardware and software. The devices can also operate by running a program stored on an externally connected non-volatile storage medium.

The disclosure being thus described, it will be apparent that it may be varied in many ways. Such variations are not to be regarded as a departure from the spirit and scope of the disclosure, and all such modifications as would be apparent to one skilled in the art are intended to be included within the scope of the following claims.

What is claimed is:

1. An information processing device connectable to a first recording device that stores first template data related to a first template and records according to the first template, comprising:
   a control unit that acquires the first template data from the first recording device, generates second template data related to a second template based on the acquired first template data, and stores the second template data in a second recording device, wherein
      the control unit acquires the first template data from the first recording device and generates the second template data by processing the first template data according to a difference in the structure of the first recording device and second recording device wherein:
   the first recording device and the second recording device are devices with different recording resolutions; and
   the control unit processes the first template data and generates the second template data according to a difference in the recording resolutions of the first recording device and second recording device, wherein:
   the second recording device can record at a plurality of recording resolutions; and
   the control unit processes the first template data according to the differences in the recording resolutions of the first recording device and second recording device, and generates second template data for each of the plurality of recording resolutions of the second recording device.

2. The information processing device described in claim 1, wherein:
   the first recording device and the second recording device are devices with different recording methods; and
   the control unit processes the first template data and generates the second template data according to a difference in the recording methods of the first recording device and second recording device.

3. An information processing device connectable to a first recording device that stores first template data related to a first template and records according to the first template, comprising:
   a control unit that acquires the first template data from the first recording device, generates second template data related to a second template based on the acquired first template data, and stores the second template data in a second recording device, wherein
      the control unit acquires the first template data from the first recording device and generates the second template data by processing the first template data according to a difference in the structure of the first recording device and second recording device, wherein:
   either the first recording device or the second recording device is a device that records by moving a first recording head relative to a recording medium, and the other is a device that records by moving the recording medium relative to a second recording head; and
   the control unit processes the first template data and generates the second template data according to a difference in the recording operations of the first recording device and second recording device.

4. A control method of an information processing device connectable to a first recording device that stores first template data related to a first template and records according to the first template, comprising:
   acquiring first template data from the first recording device; and
   generating and storing second template data related to a second template in a second recording device that records according to a second template by processing the acquired first template data according to a difference in the structure of the first recording device and the second recording device, wherein:
   the first recording device and the second recording device are devices with different recording resolutions; and
   the step of generating and storing the second template data processes the first template data according to a difference in the recording resolutions of the first recording device and second recording device, wherein:
   the second recording device can record at a plurality of recording resolutions; and
   the step of generating and storing the second template data processes the first template data according to the difference in the recording resolutions of the first recording device and second recording device, and generates second template data for each of the plurality of recording resolutions of the second recording device.

5. The control method of the information processing device described in claim 4, wherein:
   the first recording device and the second recording device are devices with different recording methods; and
   the step of generating and storing the second template data processes the first template data and generates the second template data according to a difference in the recording methods of the first recording device and second recording device.

6. A control method of an information processing device connectable to a first recording device that stores first template data related to a first template and records according to the first template, comprising:

acquiring first template data from the first recording device; and generating and storing second template data related to a second template in a second recording device that records according to a second template by processing the acquired first template data according to a difference in the structure of the first recording device and the second recording device, wherein:

either the first recording device or the second recording device is a device that records by moving a first recording head relative to the recording medium, and the other is a device that records by moving the recording medium relative to a second recording head; and the step of generating and storing the second template data processes the first template data and generates the second template data according to a difference in the recording operations of the first recording device and second recording device.

\* \* \* \* \*